April 6, 1926.                    R. C. DEALE                    1,579,651
                                CONTROL SYSTEM
                             Filed Oct. 20, 1923          2 Sheets-Sheet 1

INVENTOR
R.C. Deale
BY Wayne B Wells
ATTORNEY

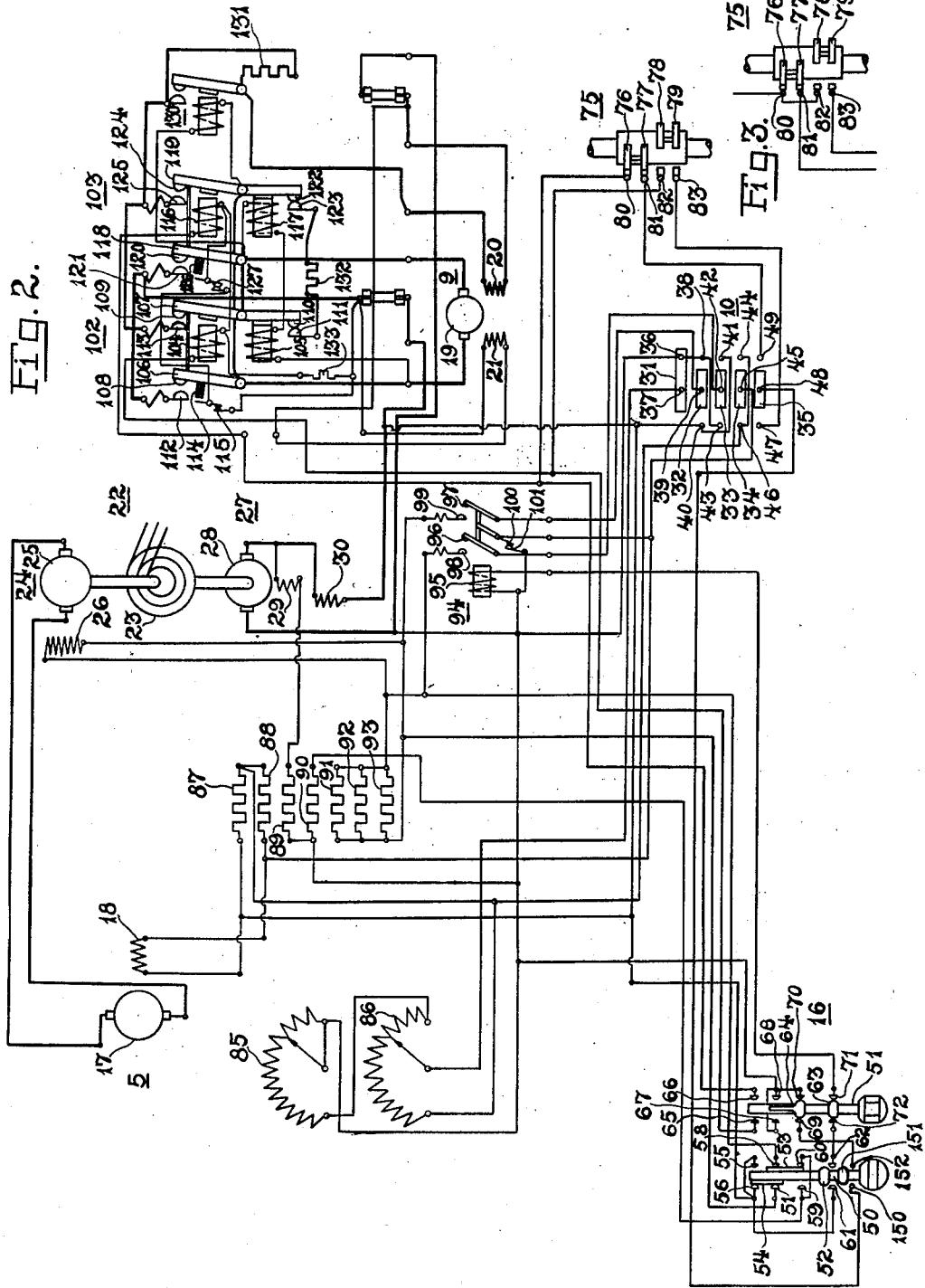

Patented Apr. 6, 1926.

1,579,651

UNITED STATES PATENT OFFICE.

ROBERT C. DEALE, OF PLAINFIELD, NEW JERSEY, ASSIGNOR TO NILES-BEMENT-POND COMPANY, OF NEW YORK, N. Y., A CORPORATION OF NEW JERSEY.

CONTROL SYSTEM.

Application filed October 20, 1923. Serial No. 669,747.

*To all whom it may concern:*

Be it known that I, ROBERT C. DEALE, a citizen of the United States, residing at Plainfield, in the county of Union and State of New Jersey, have invented certain new and useful Improvements in Control Systems, of which the following is a specification.

My invention relates to control systems and particularly to control systems for governing the operation of machine tools.

One object of my invention is to provide a control system, having a main motor and a feed motor of the direct current type supplied with power from an alternating current supply circuit, that shall be provided with automatic means for controlling the motors and manually operated means for preventing the operation of the automatic means and for operating the motors at will.

Another object of my invention is to provide a control system for operating a machine tool having a reciprocating member that shall be provided with a motor-generator set for operating the main motor and an exciter generator for operating the feed motor and for exciting the main motor and the generator of the motor-generator set and that shall be provided with a switch automatically controlled by the reciprocating member and switch means operable at will for controlling the operation of the main motor and the feed motor.

Another object of my invention is to provide a control system of the above indicated type that shall be provided with a pilot switch operated by the reciprocating member for governing the field excitation of the motor-generator set and the main motor to control the direction and the speed of rotation of the main motor and for operating the feed motor in a forward and in a reverse direction and that shall be provided with a portable switch having switch members operable at will for controlling the main motor and the feed motor and for preventing the controlling of the motors by the pilot switch.

A further object of my invention is to provide a control system of the above indicated type that shall have a relay operable by the portable switch having switch members for excluding all resistors from the main-motor field magnet winding and for preventing control of the motors by the pilot switch.

In a control system constructed in accordance with my invention, a main motor is provided for operating a reciprocating member of a machine tool such, for example, as the table of a planer. The main motor is operated by a motor-generator set which also operates an exciter generator. The exciter generator not only supplies current for energizing the field of the main motor and the field of the generator of the motor-generator set but also supplies current for operating the feed motor. In some systems heretofore built, the feed motor has been operated directly by the generator of the motor-generator set and in such case, it will be noted, the feeding movements will be varied in accordance with the operation of the main motor. Such operation is somewhat objectionable in operating a machine tool. Moreover, the feed motor may be operated somewhat by the dynamic braking current of the main motor.

A pilot switch, which is automatically operated by the table of the planer, controls the direction of current flow through the generator field winding of the motor-generator set to control the direction of rotation of the main motor. Resistors, which are included in the field-magnet winding of the main motor, are controlled by the pilot switch for varying the speed of the main motor according to the stroke of the planer. The pilot switch also controls two electromagnetic switches for operating the feed motor in a forward and in a reverse direction. In the neutral position of the pilot switch, a resistor is inserted in circuit with the field-magnet winding of the main motor to prevent over-heating of such winding in case the machine is stopped for an extended period of time while the motor-generator set is in operation.

A portable or pendent switch, having two switch members operable at will, is provided for controlling not only the main motor but also the feed motor. A relay, which is operated by the portable switch, serves to exclude all resistors from the circuit of the main-motor field-magnet winding whenever the portable switch is operated. The relay also serves to prevent any controlling of the motors by the pilot switch when the portable switch is operated.

In the accompanying drawings:

Fig. 2 is a diagrammatic view of a control system embodying my invention.

Fig. 3 is a diagrammatic view of a limit switch for operating the feed motor in a continuous direction.

Figure 1:
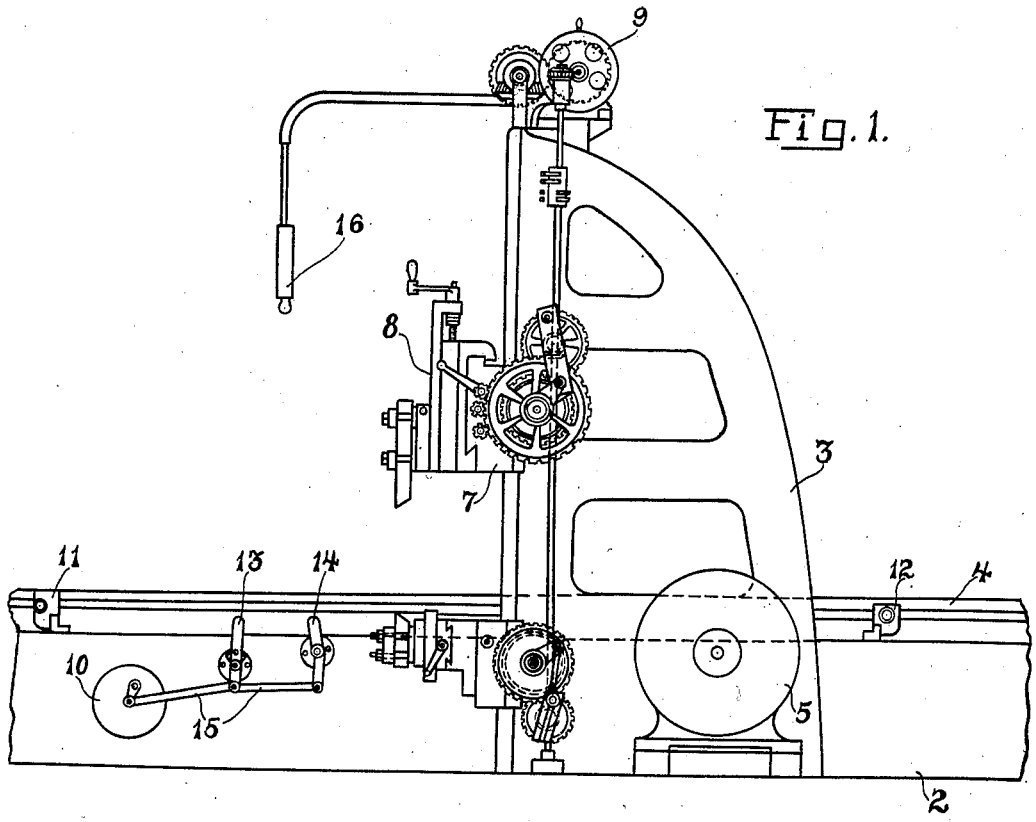
Figure 1 is a front elevational view of a planer operated by a control system constructed in accordance with my invention.

Referring to Fig. 1 of the drawings, a planer 1 is shown comprising a bed 2 and uprights 3. A table 4, which is mounted on the bed 2, is operated by a main motor 5. The main motor is connected to the table 4 by means of any suitable gearing (not shown). A cross rail 7, which is mounted on the uprights 3, carries a tool head 8. A feed motor 9 is mounted on an arch which is connected to the two uprights 3. The feed motor 9 not only serves to effect feeding and traversing movements of the tool head 8 but also serves to vary the position of the cross rail 7 on the uprights 3.

The main motor 5 and the feed motor 9 are automatically controlled by a pilot switch 10 which is suitably mounted on the bed 2 of the machine. The pilot switch 10 is operated by two dogs 11 and 12 which are mounted on the table 4 of the machine. Near the end of the forward or cutting stroke, the dog 11 engages a lever 13 for operating the pilot switch in one direction and near the end of the return stroke, the dog 12 engages a lever 14 for reversing the position of the pilot switch. The two levers 13 and 14 are connected to the pilot switch by means of links 15. The dogs 11 and 12 may be adjusted along the table 4 to vary the stroke of the planer table. A pendent switch 16, which is preferably supported on the arch of the planer, is provided not only for controlling the operation of the main motor 5 but also for controlling the operation of the feed motor 9 at will. The switch 16, as will be hereinafter set forth, is interlocked with the pilot switch 10 in such manner as to prevent any control of the two motors by the pilot switch when the pendent switch is in an operative position.

Referring to Fig. 2 of the drawings, the main motor 5 is shown comprising an armature 17 and a shunt field-magnet winding 18. The feed motor 9 comprises an armature 19, a series field-magnet winding 20 and a shunt field-magnet winding 21. A motor-generator set 22, which supplies current to the main motor 5, comprises a suitable alternating-current motor 23 and a direct-current generator 24. The generator 24 comprises an armature 25 and a shunt field-magnet winding 26. The motor-generator set 22 is mechanically connected to an exciter generator 27 comprising an armature 28, a shunt field-magnet winding 29 and a series field-magnet winding 30.

The pilot switch 10, which is automatically operated by the planer table, comprises contact segments 31 to 35, inclusive, which are adapted to engage contact fingers 36 to 49, inclusive. The pendent switch 16 comprises two switch rods 50 and 51 which are manually operated. The rod 50 serves to control the operation of the main motor 5 and the rod 51 serves to control the operation of the feed motor 9. The operation of either rod, as hereinafter set forth, serves to prevent any control of either motor by the pilot switch 10. The rod 50 carries four contact segments 151, 52, 53 and 54 which are adapted to engage contact fingers 55 to 62, inclusive, and contact fingers 150 and 152. The switch rod 51 carries two contact segments 63 and 64 which are adapted to engage contact fingers 65 to 72, inclusive.

A limit switch 75, which limits the feeding movement of the feed motor 9, comprises contact segments 76 to 79, inclusive, which are adapted to engage contact fingers 80 to 83, inclusive. Two adjustable resistors 85 and 86 are controlled by the pilot switch 10 for varying the current flow through the shunt field-magnet winding 18 to vary the speed of the main motor. The speed of the main motor is varied in the usual manner according to the direction of movement of the planer table. Two resistors 87 and 88 are provided for taking care of the inductive discharges from the shunt field-magnet winding 18 of the main motor 5. The resistor 88 also serves to prevent an excessive current flow through the shunt field-magnet winding 18 when the pilot switch 10 is in the off position. Resistors 89 and 90 are respectively provided in the shunt field-magnet winding circuits of the exciter generator 27 and the generator 24. Resistors 91, 92 and 93 are provided for taking care of the inductive discharges from the shunt field-magnet winding 26 of the generator 24.

A relay 94, which is controlled by the pendent switch 16, is provided for preventing the controlling of the motor-generator set by the pilot switch 10 when either one of the switch rods 50 and 51 is operated. The relay 94 also serves to exclude all resistors from the circuit of the shunt field-magnet winding 18 when the pendent switch 16 is in an operative position. The relay 94 comprises an energizing coil 95, two movable contact members 96 and 97, which are adapted to respectively engage contact members 98 and 99 when the relay is in an operative position, and a contact member 100 which is adapted to engage a contact member 101 when the relay is in a released position.

Two electro-magnet switches 102 and 103 are provided for controlling the operation of the feed motor 9. The electro-magnet switch 102, which is operated by the pilot switch 10 and the pendent switch 16 to effect feeding movements by the motor 9, comprises an energizing coil 104 and a holding coil 105. Two switch arms 106 and 107, which carry contact members 108, 109 and 110, are operated by the coils 104 and 105. In the released position of the switch arms 106 and 107, the contact member 110 engages a contact member 111. In the operative position of the switch arms, the contact member 108 engages a contact member 112 and the contact member 109 engages a contact member 113. The switch arm 106 is provided with a pin 114 which serves to open a switch 115 when the switch arms 106 and 107 are moved to operative position. The switch 115 serves to prevent the operation of the switch 103 when the electro-magnet switch 102 is in operative position.

The electro-magnet switch 103 comprises an energizing coil 116, a holding coil 117, and two switch arms 118 and 119. The switch arm 118 carries a contact member 120 which is adapted to engage a contact member 121 when the switch arm is in operative position. The contact arm 119 carries a contact member 122, which engages a contact member 123 in the released position of the switch arm, and a contact member 124 which engages a contact member 125 in the operative position of the switch arm 119. A pin 126, which projects from the switch arm 118, serves to open a switch 127 when the electro-magnet switch 103 is in an operative position. The switch 127 serves to prevent the operation of the switch 102 when the switch 103 is in an operative position.

An accelerating switch 130, which is connected across the terminals of the feed-motor armature, serves to short circuit an accelerating resistor 131. A dynamic-braking resistor 132 is connected in circuit with the feed motor when the two switches 102 and 103 are simultaneously released. A resistor 133 is provided in circuit with the coils 104 and 116 of the switches 102 and 103. The resistor 133 permits sufficient current to flow through the coils of the switches for holding the switches in operative position but will not permit sufficient current to flow therethrough for operating such switches. Accordingly, the circuit for operating either of the coils 104 or 116 must pass through the switches 115 and 127.

When the switch rod 51 is in the position shown and the switch rod 50 of the pendent switch is in its lower position so that the contact segment 52 bridges the contact members 61 and 62, a circuit is completed from the exciter generator for operating the relay 94. The circuit for operating the relay extends from one terminal of the exciter armature 28 through the coil 95, contact fingers 72 and 71, which are bridged by the contact segment 63, contact fingers 61 and 62, which are bridged by the contact segment 52, and the series field-magnet winding 30 to the other terminal of the armature 28. The relay 94 is operated to separate the contact members 100 and 101 and to effect engagement between the contact members 98 and 96 and the contact members 99 and 97. With the relay 94 in such position, it is assumed the table 4 is at the end of the cutting stroke so that the dog 11 engages the lever 13 to effect movement of the pilot switch 10. The pilot switch is moved towards the left, as shown in Fig. 2 of the drawings, to effect engagement between the contact segments 32, 33, 34 and 35 and the contact fingers 40, 43, 46 and 47. In such position of the pilot switch, the direction of current flow through the shunt field winding 26 of the generator 24 is reversed in order to reverse the direction of rotation of the main motor 5. The resistors 85 and 86 are included in the circuit of the main motor shunt field winding 18 in order to increase the speed of the return stroke and the electro-magnet switch 102 is operated in order to effect a feeding movement by the motor 9.

The engagement between the contact segment 35 and the contact finger 47 completes a circuit for operating the electro-magnet switch 102. The circuit extends from one terminal of the exciter-generator armature 28 through the contact fingers 69 and 70, which are bridged by the contact segment 64, contact fingers 150 and 152, which are bridged by the contact segment 151, contact fingers 48 and 47, which are bridged by the contact segment 35; contact fingers 83 and 82, which are bridged by the contact segments 78 and 79, coil 104, switch 127, switch 115, and the series field-magnet winding 30 to the other terminal of the armature 28 of the exciter generator.

The electro-magnet switch 102 is operated and a circuit is completed for operating the feed motor 9. The circuit through the feed motor extends from one terminal of the armature 28 through the series field winding 20, accelerating resistor 131, contact members 113 and 109, switch arm 107, armature 19, switch arm 106, contact members 108 and 112, and the series field-magnet winding 30 to the other terminal of the armature 28. Upon development of a sufficient counter electromotive force by the armature of the feed motor, the accelerating switch 130 is operated to short circuit the resistor 131. The shunt field-magnet winding 21 of the feed motor 9 is connected directly across the terminals of the exciter generator 27.

After a predetermined feeding movement by the motor 9, the contact segments 78 and 79 of the limit switch 75 are separated from the contact fingers 82 and 83. Thereupon, the circuit for the coil 104 of the electromagnet switch 102 is opened to release such switch. Upon release of the switch 102, a dynamic-braking circuit for the feed motor 9 is completed. The braking circuit extends from one terminal of the armature 19 through the switch arm 119, contact members 122 and 123, resistor 132, contact members 110 and 111, and the switch arm 107, to the other terminal of the armature 19. The holding coils 105 and 117 of the two switches 102 and 103 are connected across the dynamic-braking circuit to prevent operation of either of the switches when a dynamic-braking current is flowing through the motor 9. The dynamic-braking resistor is so adjusted as to effect a limited overtravel or drift by the feed motor 9. Upon separating of the contact fingers 82 and 83 from the contact segments, the overtravel of the motor effects approximately a one-quarter rotation of the limit switch.

The engagement between the contact segment 34 and the contact finger 46 completes a circuit for energizing the shunt field-magnet winding 18 of the main motor 5 through the resistors 85 and 86. The circuit through the field-magnet winding 18 extends from one terminal of the exciter armature 28 through the resistor 85, resistor 86, contact fingers 45 and 46, which are bridged by the contact segment 34, field magnet winding 18, and the series field-magnet winding 30 to the other terminal of the armature 28. It will be noted that the winding 18 is connected in circuit with the resistors 85 and 86 and accordingly the return stroke of the planer is effected at an increased speed.

The contact segments 32 and 33 of the pilot switch engage the contact fingers 40 and 43 for completing a circuit through the field-magnet winding 26 of the generator 24. The circuit through the winding 26 extends from one terminal of the exciter armature 28 through the contact fingers 43 and 42, which are bridged by the contact segment 33, contact members 96 and 98, shunt field-magnet winding 26, contact members 97 and 99, contact fingers 39 and 40, which are bridged by contact segment 32, and the series of field-magnet winding 30 to the other terminal of the exciter armature 28. The current flow through the winding 26 is in such direction as to generate a current for the motor 5 which will operate the motor in such direction as to effect a return stroke of the planer table 4. In the position of the pilot switch under consideration, the contact segment 31 disengages the contact fingers 36 in order to insert the two resistors 85 and 86 in circuit with the shunt field-magnet winding 18. The shunt field-magnet winding 29 of the exciter generator 27 is connected across the armature 28 in series with the resistor 89.

In the neutral or off position of the pilot switch 10, as shown in Fig. 2 of the drawings, the shunt field-magnet winding 18 of the main motor 5 is energized by a circuit which extends from one terminal of the exciter armature 28 through the contact fingers 36 and 37 which are bridged by the contact segment 31, resistor 86, resistor 88, winding 18, and the series field-magnet winding 30, to the other terminal of the armature 28. It will be noted the winding 18 is energized in series with the resistor 86 and the resistor 88. The resistor 88 prevents overheating of the winding 18 in case the planer is left idle an extended period of time while the motor-generator set is in operation.

Near the end of the return stroke, the dog 12 on the table 4 engages the lever 14 for operating the pilot switch 10 in a reverse direction. The pilot switch 10 is moved towards the right, as shown in Fig. 2 of the drawings. Engagement between the contact segment 35 and the contact finger 49 of the pilot switch 10 is effected to operate the electro-magnet switch 103. The switch 103 effects a feeding movement by the motor 9. The circuit completed by the engagement between the contact segment 35 and the contact finger 49 extends from one terminal of the exciter armature 28 through the contact fingers 69 and 70, which are bridged by the contact segment 64, contact fingers 150 and 152, which are bridged by the contact segment 151, contact fingers 48 and 49, which are bridged by the contact segment 35, contact fingers 80 and 81, which are bridged by the contact segments 76 and 77, coil 116, switch 127, switch 115, and the series field-magnet winding 30 to the other terminal of the exciter armature 28. The electro-magnet switch 103 is operated for completing a circuit through the feed motor 9. Upon operation of the electro-magnet switch 103, the switch 127 is opened but a holding circuit for the coil 116 is effected through the resistor 133. In like manner, when the switch 102 is operated, the switch 115 is opened and a holding circuit is effected through the resistor 133. The switches 115 and 127 prevent the simultaneous operation of the two switches 102 and 103.

The circuit through the feed motor extends from one terminal of the exciter armature 28 through the series field-magnet winding 20, resistor 131, contact members 124 and 125, switch arm 119, armature 19, switch arm 118, contact members 120 and 121, and the series field-magnet winding 30 to the other terminal of the exciter armature 28. It will be noted the current flow through the feed motor 9 is reversed, as compared with the operation of the motor by the electro-magnet switch 102, to reverse the direction of rotation thereof. Upon development of a sufficient counter electromotive force the switch 130 is operated for short circuiting the resistor 131. The feeding movement of the motor 9 is continued until the contact segments 76 and 77 disengage the contact fingers 80 and 81 to release the switch 103. Upon release of the switch 103, a dynamic braking circuit is completed through the feed motor 9 as above set forth in describing the operation of the switch 102.

The engagement between the contact segment 34 and the contact finger 44 completes a circuit for the main-motor field-magnet winding 18 through the resistors 85 and 86. However, the engagement between the contact segment 31 and the contact finger 36 short circuits the resistor 85. The circuit through the field-magnet winding 18 of the main motor 5 extends from one terminal of the exciter armature 28 through the contact fingers 36 and 37, which are bridged by the contact segment 31, resistor 86 contact fingers 44 and 45, which are bridged by the contact segment 34, winding 18, and the series field-magnet winding 30 to the other terminal of the armature 28. Inasmuch as the resistor 85 is not included in the circuit of the field winding 18, during the cutting stroke, it is apparent the speed of the cutting stroke is reduced.

The contact segments 32 and 33 of the pilot switch 10 engage the contact fingers 38 and 41 for reversing the direction of current flow through the field-magnet winding 26 of the generator 24. The circuit through the field-magnet winding 26 extends from one terminal of the exciter armature 28 through contact fingers 38 and 39, which are bridged by the contact segment 32, contact members 97 and 99, winding 26, contact members 96 and 98, contact members 42 and 41, which are bridged by the contact segment 33, and the series field magnet winding 30 to the other terminal of the armature 28. The current flow through the winding 26 is reversed to effect a reversal in the direction of rotation of the main motor 5.

The switch rod 51 of the portable switch 16 serves to effect operation of the switches 102 and 103 and thus operate the feed motor 9 at will. Upon moving of the switch rod 51 upwardly as shown in Fig. 2 of the drawings, the contact segment 63 disengages the contact fingers 71 and 72 to open the energizing circuit of the relay 94. The releasing of the relay 94 disconnects the pilot switch from the field-magnet winding 26 to prevent any control of such winding by the pilot switch. The releasing of the relay 94 also effects engagement between the contact members 100 and 101 to connect the shunt field-magnet winding 18 of the main motor 5 directly across the terminals of the exciter armature.

The separating of the contact segment 64 from the contact fingers 69 and 70 prevents any operation of the switches 102 and 103 by the pilot switch 10. The rotation of the contact rod 51 in one direction serves to bridge the contact fingers 66 and 68 by the contact segment 64. A circuit is completed in such position of the contact rod for operating the switch 103 to effect operation of the feed motor 9. The circuit for operating the switch 103 extends from one terminal of the exciter armature 28 through the contact fingers 68 and 66, which are bridged by the contact segments 64, coil 116, switch 127, switch 115, and the winding 30 to the other terminal of the exciter armature 28. Upon rotation of the contact rod 51 in a reverse direction, the contact fingers 65 and 67 are bridged by the contact segment 64 and a circuit is completed for operating the switch 102. The energizing circuit for the switch 102 extends from one terminal of the armature 28 through the contact fingers 65 and 67 which are bridged by the contact segment 64, coil 104, switch 127, switch 115, and the series field-magnet winding 30 to the other terminal of the armature 28. The switches 102 and 103 are operated in the manner heretofore set forth for controlling the feed motor 9.

The contact rod 50 is moved to the raised position shown in Fig. 2 of the drawings for effecting operation of the main motor 5 in a forward or in a reverse direction. The raising of the contact rod separates the contact segment 52 from the contact members 61 and 62 to release the relay 94. The relay 94 in the released position connects the main motor field winding directly across the exciter armature and prevents any control of the motor-generator field winding by the pilot switch. The raising of the contact rod also separates the contact segment 151 from the contact fingers 150 and 152 to prevent operation of the switches 102 and 103 by the pilot switch 10.

In the position of the switch rod 50, shown in Fig. 2 of the drawings, a circuit is completed through the field-magnet winding 26 of the generator 24 which extends from one terminal of the exciter armature 28 through the resistor 90, contact fingers 60 and 58, which are bridged by the contact segment 53, winding 26, contact fingers 56 and 57, which are bridged by the contact segment 54, and the series field-magnet winding 30 to the other terminal of the armature 28. In such position of the switch rod 50, the current flow through the generator field winding is effected in such direction as to effect a movement of the planer table in a return direction.

If it is desired to effect a movement of the planer table in the cutting direction, the contact rod 50 is rotated so that the contact segment 53 bridges the contact fingers 57 and 59 and the contact segment 54 bridges the contact fingers 55 and 58. In such position of the contact rod, a circuit is completed which extends from one terminal of the exciter armature 28 through the resistor 90, contact fingers 59 and 57, which are bridged by the contact segment 53, winding 26, contact fingers 55 and 58, which are bridged by the contact segment 54, and the series field magnet winding 30 to the other terminal of the armature 28.

If it is desirable to operate the planer with the feed motor operating in a continuous direction, the limit switch 75 is connected as shown in Fig. 3 of the drawing. The contact finger 82 is disconnected from the coil 104 of the switch 102 and is directly connected to the contact finger 80. When the limit switch is so connected, the switch 103 serves to operate the feed motor 10 in a continuous direction.

Although the motor 23 is illustrated as an alternating current motor, it is to be understood the motor of the motor-generator set may be a direct-current motor connected to a direct current supply circuit if so desired. If the motor-generator set is provided with a direct current motor, the exciter generator may be omitted from the system.

Modifications in the system, and in the arrangement and location of parts may be made within the spirit and scope of my invention and such modifications are intended to be covered by the appended claims.

What I claim is:

1. In a control system, the combination with a main motor, a feed motor, a motor-generator set for supplying current to the main motor, and an exciter generator operated by said set for supplying current to the feed motor, of an automatic switch for controlling the main motor and the feed motor, a portable switch having two switch members for respectively controlling the feed motor and the main motor at will, and means for preventing the controlling of said motors by the automatic switch when either member of the portable switch is operated.

2. In a control system, the combination with a main motor, a feed motor, a motor-generator set for supplying current to the main motor and an exciter generator operated by said set for supplying current to the feed motor and to the field-magnet windings of the main motor and the generator of said set, of an automatic switch for controlling the current supplied by the exciter generator to the feed motor and for controlling the direction of current flow through the field-magnet winding of the generator of said set, a manually operated switch having two switch members operable at will for respectively controlling the feed motor and the excitation of the generator of said set, and means for preventing the controlling of said motors by the automatic switch when either member of the manual switch is operated.

3. In a control system for a machine tool, the combination with a reciprocating member, a main motor for operating the reciprocating member, a feed motor, and means operated by alternating current for supplying direct current to the main motor and the feed motor, of a switch operated by the reciprocating member for automatically controlling the main motor and the feed motor, and a manually operated switch having two switch members for respectively controlling the main motor and the feed motor independently of the automatic switch.

4. In a control system for a machine tool, the combination with a reciprocating member, a main motor for operating the reciprocating member, a feed motor, and means operated by alternating current for supplying direct current to the main motor and the feed motor, of a switch operated by the reciprocating member for automatically controlling the main motor and the feed motor in a forward and in a reverse direction, and a manually operated switch having two switch members for respectively controlling the main motor and the feed motor independently of the automatic switch.

5. In a control system for a machine tool, the combination with a reciprocating member, a main motor for operating the reciprocating member, a motor-generator set for supplying current to the main motor, a feed motor, and an exciter generator operated by said set for supplying current to said feed motor and to the field magnet windings of the main motor and the generator of the motor-generator set, of a pilot switch operated by the reciprocating member for automatically controlling the feed motor and the main motor in a forward and in a reverse direction, a manually operated switch having two switch members for respectively operating the feed motor and the main motor at will, and means for preventing the controlling of said motors by the pilot switch when either member of the manual switch is operated.

6. In a control system for a machine tool, the combination with a reciprocating member, a main motor for operating the reciprocating member, a motor-generator set for operating the main motor, an exciter generator operated by said motor-generator set, and a feed motor operated by said exciter generator, of a pilot switch operated by said reciprocating member for controlling said set to operate the main motor in a forward and in a reverse direction, electro-magnets operated by said pilot switch for operating the feed motor in a forward and in a reverse direction, and a portable switch having two switch members for respectively controlling the main motor and the feed motor at will.

7. In a control system for a machine tool, the combination with a reciprocating member, a main motor for operating the reciprocating member, a motor-generator set for operating the main motor, an exciter generator operated by said motor-generator set, and a feed motor operated by said exciter generator, of a pilot switch operated by said reciprocating member for controlling said set to operate the main motor in a forward and in a reverse direction, electro-magnets operated by said pilot switch for operating the feed motor in a forward and in a reverse direction, a portable switch having two switch members for respectively controlling the main motor and the feed motor at will, means for preventing the controlling of the main motor and the feed motor by the pilot switch when either member of the portable switch is operated, and means for operating the main motor at different speeds in opposite directions when operated by the pilot switch.

8. In a control system for a machine tool, the combination with a reciprocating member, a main motor for operating the reciprocating member, a motor-generator set for operating the main motor, an exciter generator operated by said set, and a feed motor operated by said exciter generator, of a pilot switch operated by said reciprocating member for controlling the excitation of the main motor and the generator of said set to control the speed and the direction of rotation of the main motor, electro-magnetic switches governed by said pilot switches for operating the feed motor in a forward and in a reverse direction, a portable switch having two switch members operable at will for respectively controlling the feed motor and the main motor, and means for preventing the controlling of said motors by the pilot switch when either member of the portable switch is operated.

9. In a control system for a machine tool, the combination with a reciprocating member, a main motor for operating the reciprocating member, two resistors in the circuit of the main motor field winding, a motor-generator set for operating the main motor, a feed motor, and an exciter generator operated by said motor-generator set for operating the feed motor, of a pilot switch operated by the reciprocating member for governing the excitation of the motor-generator set to control the direction of rotation of the main motor and for controlling said two resistors to govern the speed of the main motor, an independent resistor inserted in series circuit with the field winding of the main motor in the off position of the pilot switch, and a portable switch having two switch members for controlling the main and the feed motor independently of the pilot switch.

10. In a control system for a machine tool, the combination with a reciprocating member, a main motor for operating the reciprocating member, two resistors in circuit of the main-motor field winding, a motor-generator set for operating the main motor, a feed motor, and an exciter generator operated by said motor-generator set for operating the feed motor, of a pilot switch operated by the reciprocating member for governing the excitation of the motor-generator set to control the direction of rotation of the main motor and for controlling said two resistors to govern the speed of the main motor, an independent resistor inserted in series circuit with the field winding of the main motor in the off position of the pilot switch, a portable switch having two switch members for controlling the main motor and the feed motor independently of the pilot switch, and means for preventing the controlling of the main motor and the feed motor by the pilot switch when the portable switch is operated.

11. In a control system for a machine tool, the combination with a reciprocating member, a main motor for operating the reciprocating member, resistors in circuit with the main-motor field winding, a motor-generator set for operating the main motor, an exciter generator for exciting the main motor and motor-generator set, and a feed motor operated by said exciter generator, of a pilot switch operated by the reciprocating member for controlling the excitation of the field windings of the main motor and the motor-generator set and for controlling the feed motor, a manually operated switch having two switch members for controlling the main motor and the feed motor independently of the pilot switch, and means for preventing the controlling of said motors by the pilot switch when either one of said switch members is operated and for excluding said resistors from the circuit of the main motor field winding when the manual switch is operated to control the main motor.

In testimony whereof, I hereto affix my signature.

ROBERT C. DEALE.